United States Patent [19]
Crouse et al.

[11] Patent Number: 5,601,317
[45] Date of Patent: Feb. 11, 1997

[54] CLAMPING SYSTEM

[75] Inventors: William H. Crouse; Richard V. LaHue, both of Danville, Ky.

[73] Assignee: Signet Systems, Inc., Harrodsburg, Ky.

[21] Appl. No.: 382,247

[22] Filed: Feb. 1, 1995

[51] Int. Cl.[6] ...................................................... F16L 55/00
[52] U.S. Cl. ........................... 285/242; 285/252; 285/253
[58] Field of Search ................................... 285/252, 253, 285/239, 114, 242–251, 256, 259

[56] References Cited

U.S. PATENT DOCUMENTS

| | | | |
|---|---|---|---|
| 427,132 | 5/1890 | Toomey. | |
| 953,422 | 3/1910 | Jost | 285/253 |
| 1,072,896 | 9/1913 | Albee | 285/253 |
| 1,182,161 | 5/1916 | Funk. | |
| 1,776,850 | 9/1930 | Cheswright. | |
| 2,139,745 | 12/1938 | Goodall | 285/253 |
| 2,208,706 | 7/1940 | Spencer | 285/253 |
| 2,374,541 | 4/1945 | Hartman | 24/20 |
| 2,958,549 | 11/1960 | Spafford | 285/252 |
| 3,233,922 | 2/1966 | Evans | 285/236 |
| 3,359,017 | 12/1967 | Schaub | 285/236 |
| 4,135,744 | 1/1979 | Fouts | 285/253 |
| 4,155,574 | 5/1979 | Hulsey | 285/236 |
| 4,186,948 | 2/1980 | Cronk | 285/177 |
| 4,592,575 | 6/1986 | Hughes et al. | 285/252 |
| 4,842,024 | 6/1989 | Palinchak | 285/149 |
| 5,234,233 | 8/1993 | Fix | 285/253 |
| 5,255,944 | 10/1993 | Blin et al. | 285/149 |

FOREIGN PATENT DOCUMENTS

| | | | |
|---|---|---|---|
| 566787 | 8/1960 | Belgium | 285/252 |
| 2630808 | 11/1989 | France | 285/253 |
| 589839 | 7/1947 | United Kingdom | 285/253 |

*Primary Examiner*—Eric K. Nicholson
*Attorney, Agent, or Firm*—Wood, Phillips, VanSanten, Clark & Mortimer

[57] ABSTRACT

A sealing system for sealing a hose to a barb coupling, the hose and barb coupling defining a joint having a high pressure portion associated with the barbed portion of the coupling, and a low pressure portion associated with the barbless portion of the coupling, the system comprising a constant displacement clamping portion for mounting on the portion of the hose positioned over the high pressure portion, and a constant tension clamping portion for mounting on the portion of the hose positioned over the low pressure portion.

18 Claims, 4 Drawing Sheets

CLAMPING SYSTEM

BACKGROUND OF THE INVENTION

1. Field of the Invention

The present invention relates generally to a clamping device for use with liquid and gaseous medium.

2. Problem to be Solved (i) Background and Long-Felt Need

Recent international legislation engendered by environmental concerns over the issues of global warming and ozone depletion have mandated the elimination of Chloro-Fluorocarbons or CFCs including those used in the multi-billion dollar air conditioning/refrigeration industry. Substitute refrigerants that have more beneficial environmental indices, such as R134a (a replacement for R12 which is widely used in the automotive industry), are now used in conventional air conditioning/refrigeration systems. Consequently, new SAE (Society of Automotive Engineers) standards, such as J2064, have been promulgated which have raised integrity standards for R-134a automotive air conditioning hose couplings above those of the R-12 hose couplings.

It has been found that leakage can occur when conventional rubber hoses and barb couplings or fittings, designed for use with R-12 refrigerants, are used with R-134a refrigerant. There are two causes for this leakage: (1) increased permeation rate through the hose due to the smaller molecular size of the R-134a refrigerant, and (2) plastic deformation of the hose material at the hose coupling. These causes of leakage were verified by laboratory tests conducted on configurations comprising conventional R-12 refrigerant hoses and screw clamps. The aforementioned leakage occurred between the R-12 refrigerant hose and the barb coupling and was caused by loss of compression of the hose material due to plastic deformation and hose permeation. The plastic deformation effected a reduction in torque of the screw clamp. The reduction in torque of the screw clamp effected a reduction in the clamping force applied to the hose material. Increasing the torque of the screw clamp significantly increased the leakage because the resulting increases in material compression caused plastic deformation to occur at these higher torque levels.

(ii) Objects of the Present Invention

Bearing in mind the problems and deficiencies in conventional clamping devices, it is an object of the present invention to provide a new and improved clamping system that meets the new SAE requirements for R-134a refrigerant.

It is another object of the present invention to provide a new and improved clamping system that comprises a double seal arrangement wherein a first seal reduces the pressures experienced by a second seal.

It is another object of the present invention to provide a new and improved clamping system that utilizes a first clamping portion for placement over a high pressure portion of a hose-coupling joint, and a second clamping portion for placement over a low pressure portion of the hose-coupling joint.

It is a further object of the present invention to provide a new and improved clamping system that can be manufactured at reasonable costs.

It is yet another object of the present invention to provide a new and improved clamping system that does not require replacement of costly components such as heat exchangers.

It is yet a further object of the present invention to provide a new and improved clamping system that does not require replacement of costly components such as heat exchangers, in order to convert the heat exchanger system to use alternative ozone friendly refrigerants.

Other objects and advantages of the clamping system of the present invention will be apparent to one skilled in the art in light of the ensuing description.

SUMMARY OF THE INVENTION

The above and other objects, which will be apparent to those skilled in the art, are achieved in the present invention which is directed to, in a first aspect, a sealing system for sealing a hose to a coupling, the hose having an opening for receiving the coupling, the hose and coupling defining a joint having a high pressure portion and a low pressure portion, the system comprising a constant displacement clamping portion for mounting on the high pressure portion of the joint, and a constant tension clamping portion for mounting on the low pressure portion of the joint.

In another aspect, the present invention is directed to a sealing system comprising a sealing system for sealing a hose to a barb coupling, comprising a constant displacement clamping portion for mounting on the portion of the hose substantially positioned over the barbed portion of the coupling, and a constant tension clamping portion for mounting on the portion of the hose substantially positioned over the barbless portion of the coupling.

In a further aspect, the present invention is directed to a sealing system for use with a coupling comprising a hose having an opening adapted for receiving the coupling so as to define a hose-coupling joint having a high pressure portion and a low pressure portion, and a clamp system including a constant displacement clamp mounted substantially on the high pressure portion of the joint, and a constant tension clamp mounted substantially on the low pressure portion of the joint.

In a related aspect, the present invention is directed to a sealing system for use with a coupling, comprising a barrier hose including a core tube having an opening adapted for receiving the coupling so as to define a hose-coupling joint having a high pressure portion and a low pressure portion, an inner elastomer layer disposed over the core, a braided layer disposed over the inner elastomer layer, and an outer elastomer layer disposed over the braided layer, and a clamp system including a constant displacement clamp for mounting on the high pressure portion of the joint, and a constant tension clamp for mounting on the low pressure portion of the joint.

In a further aspect, the present invention is directed to a method for sealing a hose to a coupling, comprising the steps of (a) providing a sealing system comprising an annular constant displacement clamping portion and an annular constant tension clamping portion, (b) placing the clamping system on the hose, (c) placing the hose over the coupling to form a hose coupling joint having a high pressure portion and a low pressure portion, (d) adjusting the sealing system such that the constant displacement clamping portion is positioned substantially on the high pressure portion of the joint, and the constant tension clamping portion is positioned substantially on the low pressure portion of the joint, (e) expanding and contracting the diameter of the constant tension clamping portion as the diameter of the joint expands and contracts, respectively, and (f) maintaining the diameter of the constant displacement clamping portion as the diameter of the joint expands and contracts.

In another aspect, the present invention is directed to a kit for providing a seal for sealing a hose to a coupling wherein the hose and coupling define a joint having a high pressure portion and a low pressure portion, the kit comprising a plurality of annular sealing systems, each of which having a different diameter, each sealing system comprising a constant tension portion for mounting on the low pressure portion of the joint, and a constant displacement portion for mounting on the high pressure portion of the joint.

In a further aspect, the present invention is directed to a sealing system for use with a coupling of an air conditioning system having R-134a refrigerant flowing therethrough, the sealing system comprising a barrier hose having an opening for receiving the coupling so as to define a hose-coupling joint having a high pressure portion and a low pressure portion, and a clamping system including, means for providing a constant displacement clamp on the high pressure portion of the joint, and means for providing a constant tension clamp on the low pressure portion of the joint.

BRIEF DESCRIPTION OF THE DRAWINGS

The features of the invention are believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENTS

In describing the preferred embodiments of the present invention, reference will be made herein to FIGS. 1–9 of the drawings in which like numerals refer to like features of the invention. Features of the invention are not necessarily shown to scale in the drawings.

Figure 1:
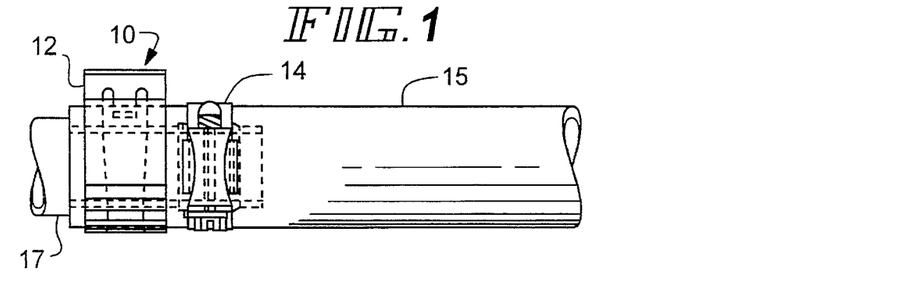
FIG. 1 is a partial top plan view showing the clamping system of the present invention mounted on a hose.
Figure 2:
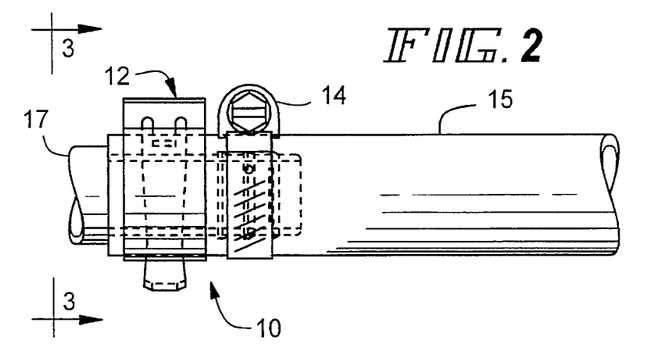
FIG. 2 is a partial side elevational view of the clamping system and hose shown in FIG. 1.
Figure 3:
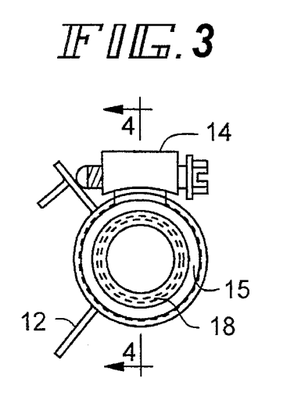
FIG. 3 is a view taken along line 3—3 of FIG. 2.

Referring to FIG. 1, clamping system 10 of the present invention comprises constant tension portion 12 and a constant displacement portion 14. Portion 12 consist of a constant tension clamp and portion 14 consist of a constant displacement clamp. Portion 14 and 15 are circumferentially mounted on hose 15. Hose 15 has an opening for receiving couplings or fittings 17 and 18 (see FIGS. 4 and 4A). The other end of the fitting 17 or 18 is connected to another hose or to a heat exchanger 19 (see FIG. 4A).

Referring to FIGS. 1, 2, 4, and 4A, hose 15 and fitting 17 define a hose-fitting joint having a low pressure side 19a and a high pressure side 19b. Similarly, hose 15 and barb fitting 18 (see FIG. 4) define a hose fitting joint having a low pressure side 23a and a high pressure side 23b. High pressure side 18b of the hose fitting is associated with the portion of the barb-fitting 18 having barbs 20 formed thereon. The lower pressure side 23a of the hose fitting joint is associated with the portion of the barb-fitting 18 without any barbs (barbless) thereon which is referred to as portion 21.

Constant tension clamp 12 is a spring-type clamp. It is highly preferable that clamp 12 is positioned substantially over the low pressure side or portions 19a or 23a of the hose-coupling joints joint formed by hose 15 and fitting 17 or 18, respectively. The capability of a hose clamp to seal a joint is determined by the clamp's effective clamping force exerted on the fitting or coupling, and by the structure of the hose-fitting joint. Hose-fitting joints shrink and expand in response to fluctuations in the temperature of the working fluid and the working environment. As used herein, working environment is defined to be the environment in which the hose-fitting joint is used, e.g. engine compartment, air conditioning system, type of fluids flowing through the hose-fitting joint, etc. The temperature to which the hose-fitting-joint is exposed is determined by the temperature of the working environment. Additionally, characteristics of the hose material are other critical factors which affect the sealing capability of a hose clamp. The diameter of spring clamp 12 is flexible and can expand or contract in response to temperature related expansions or shrinkages, respectively, of the joint formed by hose 15 and fitting 17 or 18. In an automotive environment, the temperature of the working environment is mainly determined by the environmental conditions in the engine compartment. However, the temperature of the fluid flowing through the hose-fitting joint may also contribute to the temperature of the working environment. As the temperature of the working environment increases to about +120° C., the hose-fitting joint expands. In response, spring clamp 12 expands in diameter to compensate for the increase in the diameter of the hose-fitting joint thereby maintaining the same amount of pressure between spring clamp 12 and the joint formed by hose 15 and fitting 17 or 18. Since, spring clamp 12 expands with the hose-fitting joint, permanent compression and deformation of hose 15 is avoided since the pressure between clamp 12 and hose 15 never exceeds the maximum pressure that the material of hose 15 can withstand. As the temperature of the working environment decreases from about +120° C. to ambient temperature and below, the diameter of the hose-fitting joint decreases. In response, spring clamp 12 contracts thereby reducing its diameter to compensate for the decrease in diameter of the hose-fitting joint. Since (permanent) deformation of hose 15 does not occur at higher temperatures, and the diameter of the spring clamp 12 decreases with the diameter of the hose-fitting joint, there is no reduction in the pressure between clamp 12 and the hose-fitting joint. Thus, there is no reduction of effective clamping force exerted by clamp 12 on the hose-fitting joint. Furthermore, spring clamp 12 maintains uniform contact with hose 15 as the temperature of the working environment around the hose-fitting joint varies. Thus, there are never any gaps or spaces formed between spring clamp 12 and hose 15. Thus, spring clamp 12 follows all diameter changes of the hose-fitting joint thereby: (1) precluding an increase in clamping force, at high temperatures, to a level at which hose 15 will become permanently deformed, and (2) providing effective clamping force on the hose-fitting joint at low temperatures. In a preferred embodiment, spring clamp 12 exhibits a clamping force, during temperature cycling, between about 220 N and 580 N, (wherein N is newtons) inclusive, over a temperature range between about −30° C. and +120° C., inclusive. In a preferred embodiment, spring clamp 12 is fabricated from a corrosion resistant metal. Preferably, spring clamp 12 is manufactured by Mubea, Inc. Spring clamp 12 is also available from Oetiker, Inc.

Constant displacement clamp 14 is a "worm-screw" clamp and is positioned over the high pressure side or portion of the hose-fitting joint. As the temperature of the working environment increases, the diameter of the hose-fitting joint increases thereby effecting an increase in pressure between screw clamp 14 and the hose-fitting joint. Screw clamp 14 does not expand in diameter as the joint diameter increases. However, screw clamp 14 is torqued in a manner such that permanent hose compression or deformation occurs at high temperatures, e.g. +120° C. As the temperature of the working environment decreases, the diameter of the joint decreases thus effecting a reduction in the clamping force exerted by screw clamp 14 upon the hose-fitting joint. Since the clamping force exerted by screw clamp 14 is reduced as the diameter of the hose-fitting joint decreases, leakage of the fluid (or other medium) occurs in the area designated by numeral 26 for fitting 17 (see FIG. 4A) or past barbs 20 in the area designated by the numeral 22 (see FIG. 4). Such leakage, however, is impeded by constant tension clamp (spring clamp) 12. Thus, no leakage occurs at the joint 25 formed between end portion 15a of hose 15 and fitting 17, or at joint 24 formed between end portion 15a of hose 15 and fitting 18. In a preferred embodiment, screw clamp 14 is capable of exerting a clamping force, during temperature cycling, between about 0 N and 1380 N, inclusive, over a temperature range between about −30° C. and +120° C., inclusive.

In a preferred embodiment, the distance D between spring clamp 12 and screw clamp 14 is between about 0.087 inch and 0.107 inch. More preferably, the distance D is about 0.097 inch.

Constant displacement clamp (screw clamp) 14 acts as a pressure reducing device which allows constant tension clamp 12 to function as the primary seal thereby allowing constant tension clamp (spring clamp) 12 to be used in applications having pressure that is higher than the maximum rated pressure of spring clamp 12.

Clamping system 10 of the present invention can be configured as separate portions, i.e., spring clamp 12 and screw clamp 14, or as a unitary device. If spring clamp 12 and screw clamp 14 are to be configured as a unitary device, then a flexible braid or strap can be used to join spring clamp 12 and screw clamp 14. It is preferable that clamps 12 and 14 be attached to the braid or strap in a manner such that the distance D separates both clamps.

In order to minimize the friction between clamp 12 and hose 15 during installation of spring clamp 12, and to provide uniform distribution of the clamping force upon the hose-fitting joint, the inside surface of clamp 12 is preferably coated with a durable wax. As the temperature of the working environment increases, the wax softens thereby allowing spring clamp 12 to set properly on the hose fitting joint thus effecting uniform distribution of clamping force upon the joint, and effecting an increase in leakage pressure (the amount of pressure necessary to create leakage) between about 0.5 and 1.5 bar. The increase in leakage pressure depends upon the design of the hose-fitting joint.

Figure 4:
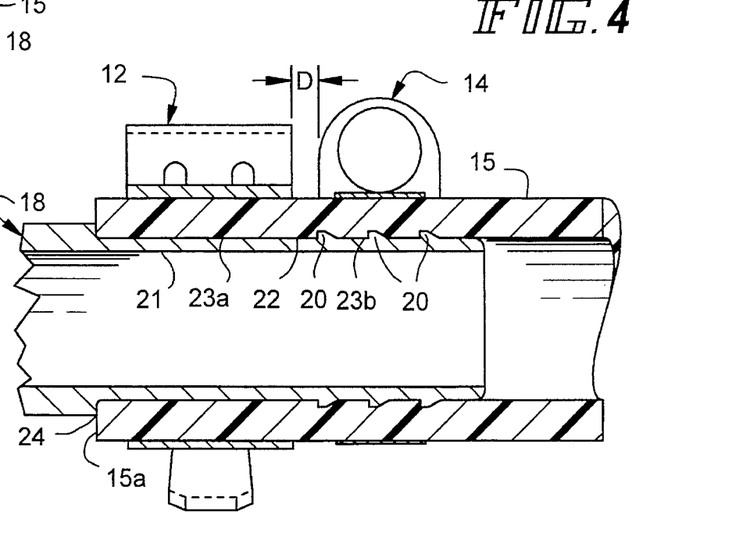
FIG. 4 is a view taken along line 4—4 of FIG. 3.
Figure 4A:
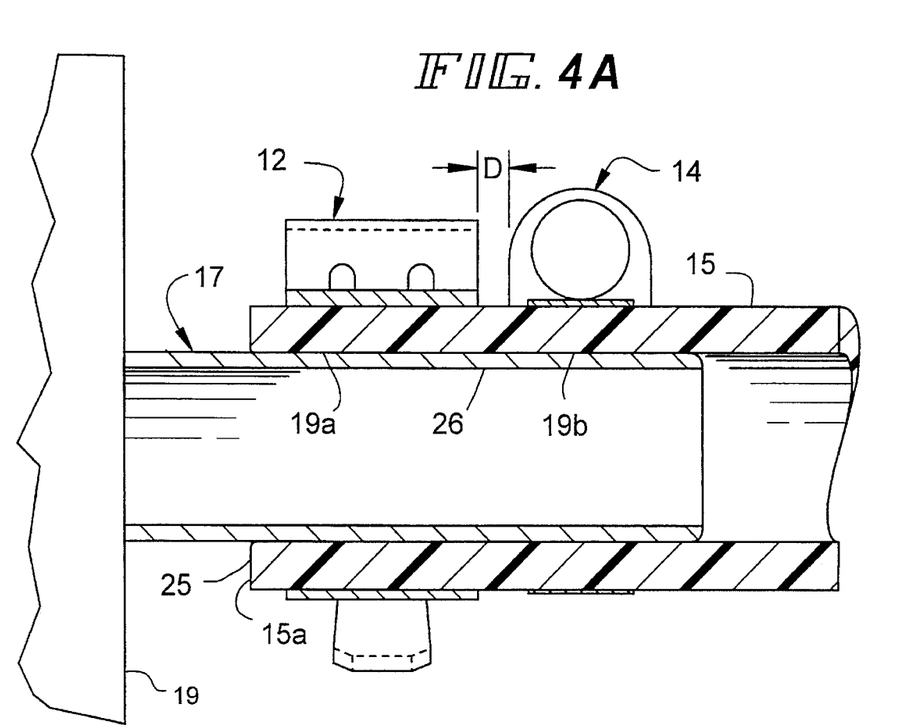
FIG. 4A is a partial view in cross-section similar to FIG. 4.
Figure 5:
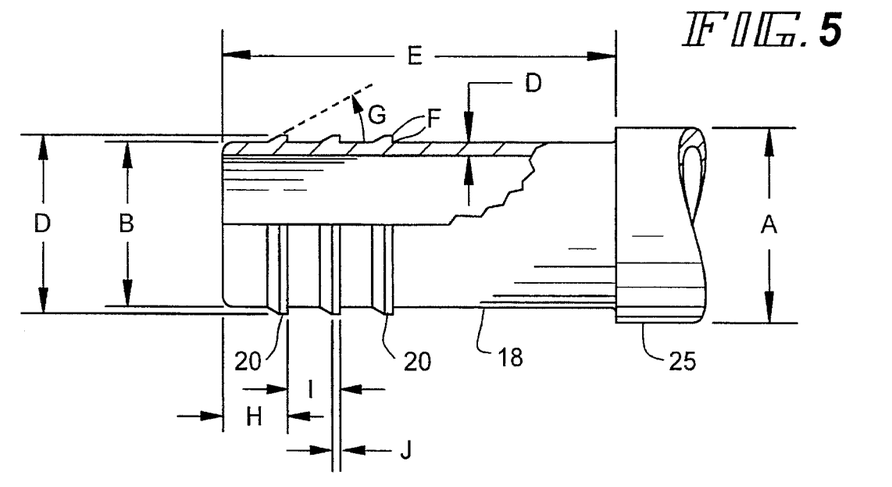
FIG. 5 is a side elevational view, partially in cross section, of a barb fitting that may be used with the clamping system of the present invention.
Figure 6:
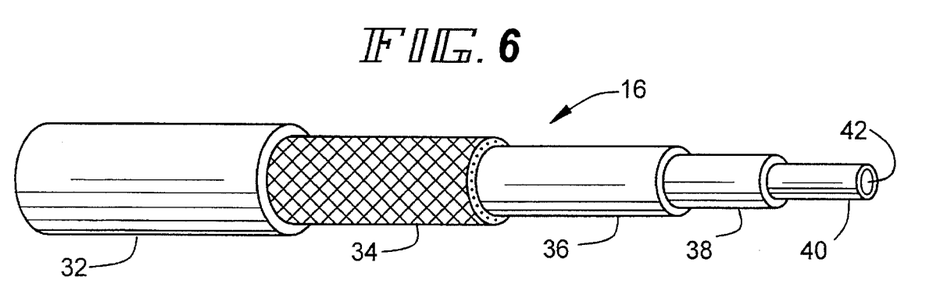
FIG. 6 is a partial side elevational view of a barrier hose used with the clamping system of the present invention.

If clamping system 10 of the present invention is to be used with a barb-fitting, such as barb-fitting 18 shown in FIG. 4, then it is preferable that barb fitting 18 be of the configuration shown in FIG. 5. Tables 1 and 2 below show the preferred range of values for barb fitting 18 wherein the following variables refer to the corresponding characteristics:

A: outer diameter (O.D.) of connecting conduit 25;

B: outer diameter of barb fitting;

C: diameter of barb fitting measured from perimetrical edge of the barbs;

D: barb fitting thickness;

E: length of barb fitting;

F: height of the barb;

G: barb angle

H: distance from barb to opening of barb fitting;

I: barb spacing; and

J: width of barb perimetrical edge.

TABLE 1

| A | HOSE | B | C | D |
|---|---|---|---|---|
| O.D. | SIZE-I.D. | ± +/−0.003 in | +0.007 in. −0.000 in. | |
| 3/8 | #6 5/16 | 0.312 in. | 0.372 in. | 0.032 in.–0.052 in. |
| 1/2 | #8 13/32 | 0.410 in. | 0.470 in. | 0.032 in.–0.052 in. |
| 5/8 | #10 1/2 | 0.500 in. | 0.557 in. | 0.032 in.–0.052 in. |
| 3/4 | #12 5/8 | 0.625 in. | 0.685 in. | 0.046 in.–0.052 in. |

TABLE 2

| Dimension | Preferred Value |
|---|---|
| E | About 1.5 inches |
| F | Between about 0.010 and 0.015, inclusive |
| G | Between about 30 and 32 degrees, inclusive |
| H | About 0.25 inch |
| I | About 0.20 inch |
| J | About 0.030 inch |

It is preferable that screw clamp 14 of clamping system 10 be positioned over at least two (2) of barbs 20.

The structure and materials with which hose 15 is fabricated depend on the type of fluid or gaseous medium with which clamping system 10 is to be used. It is highly preferably that hose 15 be configured as hose 16 shown in FIG. 6. Hose 16 is a barrier hose and is comprised of elastomer cover 32, preferably fabricated from butyl, braid reinforcement 34, preferably fabricated from polyester, barrier 36 which is preferably fabricated from nitrile butylene rubber, barrier 38, which is preferably fabricated from nylon, and elastomer core tube 40, which is preferably fabricated from neoprene rubber. Core 40 has opening 42 therein for receiving the coupling or fitting. Hose 16 exhibits one-fifth (1/5) the permeation rate of typical Nytril hoses. Barrier hose 16 preferably has the characteristics shown in Table 3. It is highly preferable that nylon barrier 38 be utilized for applications where the medium flowing though the hose is R134a refrigerant. Hose 16 may also be utilized for pneumatic or hydraulic applications, or where the medium consists of brines or water.

TABLE 3

| NOM SIZE (in) | DASH | HOSE I.D. in (mm) | | HOSE O.D. in (mm) | | MIN BURST psi (BAR) | PROOF psi (BAR) | WORKING psi (BAR) | BEND RADIUS (mm) | WEIGHT WEIGHT Kg/M | TIR max |
|---|---|---|---|---|---|---|---|---|---|---|---|
| | | MIN | MAX | MIN | MAX | | | | | | |
| 5/16 | 6 | 7.8 | 8.6 | 14.2 | 15.2 | 2500 175 | 1000 70.0 | 500 35 | 51 | .14 | .76 |
| 13/32 | 8 | 10.2 | 11.2 | 16.8 | 17.8 | 2500 175 | 1000 70.0 | 500 35 | 64 | .18 | .76 |
| 1/2 | 10 | 12.4 | 13.5 | 18.9 | 19.9 | 1750 123 | 1000 70.0 | 500 35 | 76 | .19 | .76 |
| 5/8 | 12 | 15.6 | 16.6 | 23.1 | 24.1 | 1750 123 | 1000 70.0 | 500 35 | 102 | .30 | .76 |

Such a barrier hose is manufactured by Goodyear Rubber, Inc. and is marketed as the Goodyear Galaxy 4860 barrier hose. Another suitable barrier hose is manufactured by Parker Inc. and is marketed as the Parker Hannifin 7694 barrier hose.

TEST RESULTS

Figure 7:
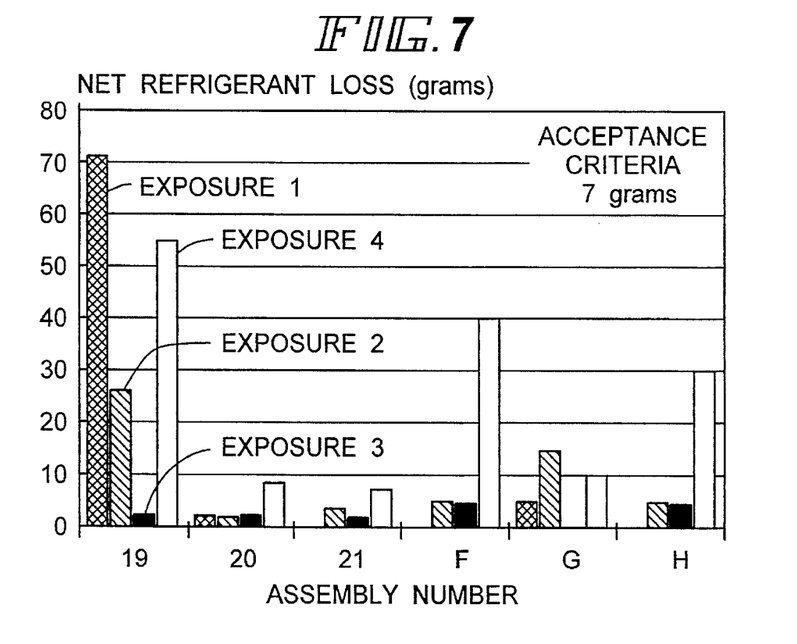
FIG. 7 graphically illustrates test results of a conventional clamping system.

Coupling integrity tests performed in accordance with paragraph 5.3 of SAE J2064 (entitled "R134a Refrigerant Automotive Air-Conditioning Hose") on clamping system 10 of the present invention and the conventional R-12 clamping assembly. SAE J2064 has set the accepted criteria for net refrigerant loss at 7.0 grams. Clamping system 10 of the present invention exhibited unexpectedly good results during testing which are shown in Table 5 and the graph of FIG. 8. The data in Table 5 corresponds to the bars in FIG. 8. Assembly 8 exhibited a net refrigerant loss of 12.51 grams during exposure 4. As shown in Table 5 and FIG. 8, this was the only net loss that was above the acceptance criteria of 7.0 grams out of a total of 56 exposures (98.2% success rate). However, in order to clearly demonstrate the superior performance of clamping system 10 of the present invention, in comparison to the conventional R-12 clamp assembly, Table 4 and the graph of FIG. 7 are provided to show the test results for the conventional R-12 clamping assembly. As shown in Table 4, assemblies 19, 20, F, G and H exhibited net losses of refrigerant that were above the acceptance criteria of 7.0 grams for seven (7) exposures out of a total of 24 exposures (70.8% success rate). However, the total net loss for all exposures of each assembly was above the acceptance criteria of 7.0 grams.

The tests were performed on six (6) assemblies having 76 mm (3.0") of exposed hose that were attached to a canister having an internal volume of 1260 cm³ of (77 in³). The canister assembly was charged with 10 cm³ of R-134a compatible lubricant. The weight in grams of the assembly was recorded. The internal volume of the assembly was determined and the R-134a charge was calculated to be the assembly volume times (×) 0.0783 g/cm³ (the density constant of R-134a gas at 125° C. (257° F.) and 2.07 MPa (300 psig)). The assembly was charged with the appropriate amount of R-134a and weighed to determine the original amount. The test included four exposure intervals, each followed by a leakage evaluation and possible recharging before the next exposure interval. The four exposure intervals in sequential order are as follows:

Exposure 1–96 hours at 125° C. (257° F.).

Exposure 2–48 hour thermal cycling from –30° to 125° C. (–22° to 257° F.). The assemblies were moved between the hot and cold chambers every 4 hours.

Exposure 3–96 hours at 125° C. (257° F.).

Exposure 4–48 hour thermal cycling from –30° to 125° C. (–22° to 257° F.). The assemblies were moved between the hot and cold chambers every 4 hours.

After each exposure interval, as soon as the assembly reached room temperature, it was evaluated as follows:

Each assembly was weighed and the loss in grams recorded.

Each hose was flexed ±15 degrees. Ten (10) flex cycles were made in approximately 10 seconds in each perpendicular plane. Each assembly was immediately evaluated for charge loss (hissing) and fluid leaking.

Each assembly was reweighed after flex testing and continued with the next exposure interval if the weight was within 4 grams of the original weight. If the loss was between 4 and 7 grams the assembly was recharged to within 4 grams of the original weight. If the loss exceeded 7 grams, the test was terminated.

Table 4 and the graph of FIG. 7 show the test results for the conventional R-12 clamping assembly. The conventional R-12 assembly consisted of a rubber hose clamped to a barb-fitting of the canister by means of a single screw clamp. Assemblies 19, 20 and 21 were comprised of a 16 mm diameter rubber suction hoses manufactured by Parker Hannifin and marketed as the PH 7622 hose. Assemblies F, G and H were comprised of 10 mm diameter rubber discharge hoses manufactured by Goodyear and marketed as the GY 4779.

TABLE 4

| | (Prior Art) | | | | | |
|---|---|---|---|---|---|---|
| ASSEMBLY | 19 | 20 | 21 | F | G | H |
| Hose Type | PH7622 | PH7622 | PH7622 | GY4779 | GY4779 | GY4779 |
| Hose Size | 16 mm | 16 mm | 16 mm | 10 mm | 10 mm | 10 mm |
| Length of Test (Days) | 15 | 15 | 15 | 18 | 18 | 18 |
| Volume (cm3) | 28.09 | 28.09 | 28.09 | 28.09 | 28.09 | 28.09 |
| Initial Charge Amount (grams) | 70.18 | 75.25 | 76.04 | 72.58 | 81.64 | 63.5 |

TABLE 4-continued

|  | (Prior Art) | | | | | |
|---|---|---|---|---|---|---|
| ASSEMBLY | 19 | 20 | 21 | F | G | H |
| EXPOSURE 1 | | | | | | |
| Initial Torque (in. lbs.) | 40 | 40 | 40 | 40 | 40 | 40 |
| Exposure Loss (grams) | 71.45 | 2.49 | 0.25 | 0 | 5 | 0 |
| Flex Loss (grams) | 0 | 0 | 0.01 | 0 | 0 | 0 |
| Net Loss (grams) | 71.45 | 2.49 | 0.26 | 0 | 5 | 0 |
| Avg Clamp Delta (in. lbs.) | 35 | 30 | 30 | UNK | UNK | UNK |
| Avg After Clamp Torque (in. lbs.) | 5 | 10 | 10 | UNK | UNK | UNK |
| EXPOSURE 2 | | | | | | |
| Initial Torque (in. lbs.) | 40 | 10 | 10 | UNK | UNK | UNK |
| Exposure Loss (grams) | 26.33 | 1.97 | 3.62 | 5 | 10 | 5 |
| Flex Loss (grams) | 0.02 | 0 | 0.01 | 0 | 5 | 0 |
| Net Loss (grams) | 26.35 | 1.97 | 3.63 | 5 | 15 | 5 |
| Avg Clamp Delta (in. lbs.) | 20 | 0 | 0 | UNK | UNK | UNK |
| Avg After Clamp Torque (in. lbs.) | 20 | 10 | 10 | UNK | UNK | UNK |
| EXPOSURE 3 | | | | | | |
| Initial Torque (in. lbs.) | 20 | 10 | 10 | UNK | UNK | UNK |
| Exposure Loss (grams) | 2.57 | 2.53 | 2.28 | 5 | 0 | 5 |
| Flex Loss (grams) | 0.05 | 0 | 0 | 0 | 0 | 0 |
| Net Loss (grams) | 2.62 | 2.53 | 2.28 | 5 | 0 | 5 |
| Avg Clamp Delta (in. lbs.) | 0 | 0 | 0 | UNK | UNK | UNK |
| Avg After Clamp Torque (in. lbs.) | 20 | 10 | 10 | UNK | UNK | UNK |
| EXPOSURE 4 | | | | | | |
| Initial Torque (in. lbs.) | 20 | 10 | 10 | UNK | UNK | UNK |
| Exposure Loss (grams) | 54.98 | 9.25 | 6.97 | 40 | 10 | 30 |
| Flex Loss (grams) | 0 | 0 | 0 | 0 | 0 | 0 |
| Net Loss (grams) | 54.98 | 9.25 | 6.97 | 40 | 10 | 30 |
| Avg Clamp Delta (in. lbs.) | 0 | 5 | 5 | UNK | UNK | UNK |
| Avg After Clamp Torque (in. lbs.) | 20 | 5 | 5 | UNK | UNK | UNK |
| SUMMARY DATA | | | | | | |
| Total Loss (All Exp) | 83.95 | 16.24 | 13.14 | 50 | 30 | 40 |
| Avg Loss Rate (All Exp) | 10.49/day | 1.35/day | 1.1/day | 12.5/day | 7.5/day | 10/day |
| Avg Delta (All Exp) | 13.33 | 8.75 | 8.75 | UNK | UNK | UNK |
| Avg After Clamp Torque (in. lbs.) | 20 | 8.75 | 8.75 | UNK | UNK | UNK |

The net loss of refrigerant for each exposure is the sum of the exposure loss and the flex loss. The total loss of refrigerant for each assembly is the sum of the quantities representative of net loss for each exposure. As shown in Table 4, the total net loss for all exposures of assembly 19 is 83.95 grams. The net loss of 71.45 grams for the first exposure was not included in this total because the barb fitting burst while under pressure, thus necessitating the refill of the canister. The average loss rate for all exposures was 10.49 grams/day for the fifteen (15) day testing period. The average clamp delta (screw clamp easing) for all exposures was 13.33 in.-lbs. Assembly 20 exhibited a total net loss for all exposures of 16.24 grams. The average loss rate for all exposures was 1.35 grams/day for the fifteen (15) day testing period. The average clamp delta (screw clamp easing) for all exposures was 8.75 in. lbs. Assembly 21 exhibited a total net loss for all exposures of 13.14 grams. The average loss rate for all exposures was 1.1 grams/day for the fifteen (15) day testing period. The average clamp delta (screw clamp easing) for all exposures was 8.75 in. lbs. Assembly F exhibited a total net loss for all exposures of 50 grams. The average loss rate for all exposures for assembly F was 12.5 grams/day for the eighteen (18) day testing period. The average clamp delta (screw clamp easing) for all exposures of assembly F was not recorded. Assembly G exhibited a total net loss for all exposures of 30 grams. The average loss rate for all exposures for assembly G was 7.5 grams/day for the eighteen (18) day testing period. The average clamp delta (screw clamp easing) for all exposures of assembly G was not recorded and is therefore unknown (designated by "UNK"). Assembly H exhibited a total net loss for all exposures of 40 grams. The average loss rate for all exposures was 10.0 grams/day for the eighteen (18) day testing period. The average clamp delta (screw clamp easing) for all exposures of assembly H was not recorded and is therefore unknown. The total net loss for all assemblies (sum of total net losses of each assembly) is 233.33 grams. The average total net loss for all assemblies was 38.88 grams. In addition to the exposure tests described above in Table 4, thirty-three (33) tests were performed on the conventional R-12 clamp assembly. These additional tests showed similar results.

Similar tests were also conducted on another conventional clamp assembly which was comprised of two (2) screw clamps and a rubber hose. The torque of each screw clamp was set at 55 in.lbs. Five (5) assemblies were subjected to three (3) exposure tests. Fifteen (15) exposures were conducted and all but 1 (one) resulted in an exposure loss greater than the 7.0 gram acceptance criteria. The average total exposure loss for each assembly was 172.21 grams.

Figure 8:
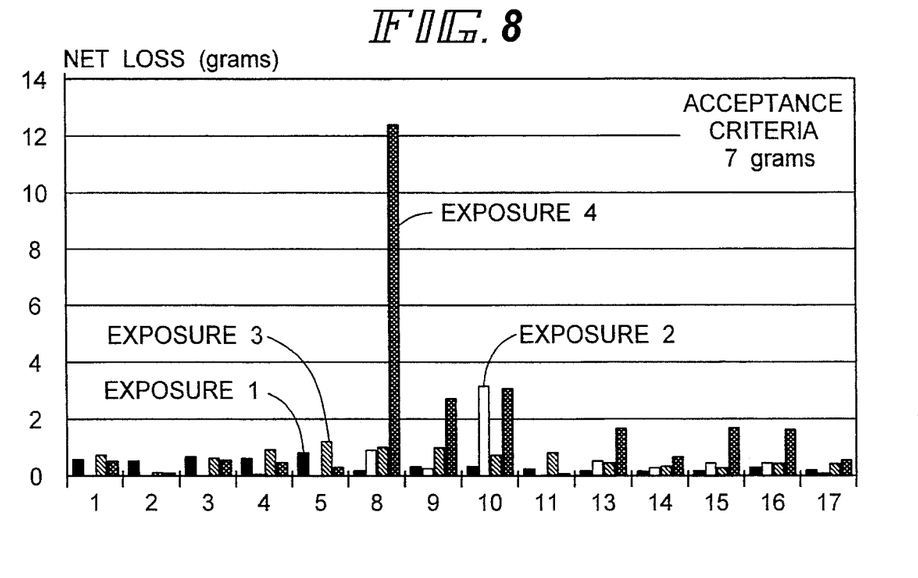
FIG. 8 graphically illustrates test results of the clamping system of the present invention.

Tables 5A, 5B and 5C, and the graph of FIG. 8 show the test results for clamping system 10 of the present invention. For all exposures, clamping system 10 utilized a barrier hose constructed in accordance with barrier hose 16 shown in FIG. 6 and manufactured by Goodyear (the aforementioned Goodyear Galaxy 4860 barrier hose: "GY 4860"). The barrier hose was connected to a barb-fitting of the canister via clamping system 10. Screw clamp 14 was set at 40 in-lbs. torque. Assemblies 1–5 used 8 mm liquid hoses, assemblies 8–11 used 10 mm discharge hoses and assemblies 13–17 use 16 mm suction hoses.

TABLE 5A

| ASSEMBLY | (Present invention) | | | | |
|---|---|---|---|---|---|
| | 1 | 2 | 3 | 4 | 5 |
| Hose Type | GY4860 | GY4860 | GY4860 | GY4860 | GY4860 |
| Hose Size | 8 mm | 8 mm | 8 mm | 8 mm | 8 mm |
| Length of Test (Days) | 15 | 15 | 15 | 15 | 15 |
| Volume (cm3) | 4 | 4 | 4 | 4 | 4 |
| Initial Charge Amount (grams) | 88.96 | 77.16 | 89.63 | 94.31 | 93.76 |
| EXPOSURE 1 | | | | | |
| Initial Torque (in. lbs.) | 40 | 40 | 40 | 40 | 40 |
| Exposure Loss (grams) | 0.60 | 0.56 | 0.70 | 0.63 | 0.83 |
| Flex Loss (grams) | NA | NA | NA | NA | NA |
| Net Loss (grams) | 0.60 | 0.56 | .70 | 0.63 | 0.83 |
| Avg Clamp Delta (in. lbs.) | 20 | 15 | 25 | 20 | 20 |
| Avg After Clamp Torque (in. lbs.) | 20 | 25 | 15 | 20 | 20 |
| EXPOSURE 2 | | | | | |
| Initial Torque (in. lbs.) | 40 | 40 | 40 | 40 | 40 |
| Exposure Loss (grams) | 0 | 0 | 0 | 0.15 | 0.05 |
| Flex Loss (grams) | NA | NA | NA | NA | NA |
| Net Loss (grams) | 0 | 0 | 0 | 0.15 | 0.05 |
| Avg Clamp Delta (in. lbs.) | 20 | 20 | 20 | 20 | 15 |
| Avg After Clamp Torque (in. lbs.) | 20 | 20 | 20 | 20 | 25 |
| EXPOSURE 3 | | | | | |
| Initial Torque (in. lbs.) | 20 | 20 | 20 | 20 | 25 |
| Exposure Loss (grams) | 0.75 | 0.16 | 0.64 | 0.97 | 1.22 |
| Flex Loss (grams) | NA | NA | NA | NA | NA |
| Net Loss (grams) | 0.75 | 0.16 | 0.64 | 0.97 | 1.22 |
| Avg Clamp Delta (in. lbs.) | 5 | 5 | 0 | 5 | 5 |
| Avg After Clamp Torque (in. lbs.) | 15 | 15 | 20 | 15 | 15 |
| EXPOSURE 4 | | | | | |
| Initial Torque (in. lbs.) | 15 | 15 | 20 | 15 | 15 |
| Exposure Loss (grams) | 0.57 | 0.13 | 0.57 | 0.50 | 0.33 |
| Flex Loss (grams) | NA | NA | NA | NA | NA |
| Net Loss (grams) | 0.57 | 0.13 | 0.57 | 0.50 | 0.33 |
| Avg Clamp Delta (in. lbs.) | 0 | 0 | 0 | 0 | 0 |
| Avg After Clamp Torque (in. lbs.) | 15 | 15 | 20 | 15 | 20 |
| SUMMARY DATA | | | | | |
| Total Loss (All Exp) | 1.92 | 0.85 | 1.91 | 2.25 | 2.43 |
| Avg Loss Rate (All Exp) | 0.16/day | .07/day | .16/day | .05/day | .05/day |
| Avg Delta (All Exp) | 11.25 | 10 | 11.25 | 11.25 | 10 |
| Avg After Clamp Torque (in. lbs.) | 12.5 | 18.75 | 18.75 | 17.5 | 18.75 |

Table 5A shows the results for assemblies 1–5 which utilize 8 mm diameter hoses. The net loss for each exposure, except exposure three (3) for assembly five (5), never exceeded 1.0 gram. The net loss of assembly five (5) for exposure three (3) was 1.22 grams. The average total loss for all exposures for all assemblies 1–5 was 1.87 grams, well below the acceptance criteria of 7.0 grams.

TABLE 5B

| ASSEMBLY | (Present Invention) | | | |
|---|---|---|---|---|
| | 8 | 9 | 10 | 11 |
| Hose Type | GY4860 | GY4860 | GY4860 | GY4860 |
| Hose Size | 10 mm | 10 mm | 10 mm | 10 mm |
| Length of Test (Days) | 21 | 21 | 21 | 21 |
| Volume (cm3) | 6.4 | 6.4 | 6.4 | 6.4 |
| Initial Charge Amount (grams) | 93.33 | 91.69 | 90.72 | 89.79 |
| EXPOSURE 1 | | | | |
| Initial Torque (in. lbs.) | 40 | 40 | 40 | 40 |
| Exposure Loss (grams) | 0.19 | 0.32 | 0.33 | 0.23 |
| Flex Loss (grams) | 0 | 0 | 0 | 0 |
| Net Loss (grams) | 0.19 | 0.32 | 0.33 | 0.23 |
| Avg Clamp Delta (in. lbs.) | 25 | 20 | 15 | 25 |

TABLE 5B-continued

| | (Present Invention) | | | |
|---|---|---|---|---|
| ASSEMBLY | 8 | 9 | 10 | 11 |
| Avg After Clamp Torque (in. lbs.) | 15 | 20 | 25 | 15 |
| EXPOSURE 2 | | | | |
| Initial Torque (in. lbs.) | 15 | 20 | 25 | 15 |
| Exposure Loss (grams) | 0.92 | 0.28 | 3.18 | 0.05 |
| Flex Loss (grams) | 0 | 0 | 0 | 0 |
| Net Loss (grams) | 0.92 | 0.28 | 3.18 | 0.05 |
| Avg Clamp Delta (in. lbs.) | 0 | 5 | 5 | 0 |
| Avg After Clamp Torque (in. lbs.) | 15 | 15 | 20 | 15 |
| EXPOSURE 3 | | | | |
| Initial Torque (in. lbs.) | 15 | 15 | 20 | 15 |
| Exposure Loss (grams) | 1.01 | 0.9 | 0.73 | 0.81 |
| Flex Loss (grams) | 0 | 0.08 | 0 | 0 |
| Net Loss (grams) | 1.01 | 0.98 | 0.73 | 0.81 |
| Avg Clamp Delta (in. lbs.) | 0 | 3 | 1 | 2 |
| Avg After Clamp Torque (in. lbs.) | 15 | 12 | 19 | 13 |
| EXPOSURE 4 | | | | |
| Initial Torque (in. lbs.) | 15 | 12 | 19 | 13 |
| Exposure Loss (grams) | 12.51 | 2.45 | 3.12 | 0.08 |
| Flex Loss (grams) | 0 | 0.28 | 0 | 0 |
| Net Loss (grams) | 12.51 | 2.73 | 3.12 | 0.08 |
| Avg Clamp Delta (in. lbs.) | 3 | 0 | 1 | 0 |
| Avg After Clamp Torque (in. lbs.) | 12 | 12 | 18 | 13 |
| SUMMARY DATA | | | | |
| Total Loss (All Exp) | 14.63 | 4.31 | 7.36 | 1.17 |
| Avg Loss Rate (All Exp) | 1.22/day | .36/day | .61/day | .10/day |
| Avg Delta (All Exp) | 7 | 7 | 5.5 | 6.75 |
| Avg After Clamp Torque (in. lbs.) | 14.25 | 14.75 | 20.5 | 14 |

Table 5B shows the results for assemblies 8–11 which utilize 10 mm diameter hoses. The net loss of every assembly for each exposure, except assembly 8 for exposure 4, was below the acceptance criteria of 7.0 grams. In fact, of the sixteen (16) exposures shown in Table 5B, the net loss for twelve (12) exposures was below 1.0 gram. Exposure 3 of assembly 8 resulted in a net loss of 1.01 grams. Exposure 4 of assemblies 9 and 10 resulted in net losses of 2.73 grams and 3.12 grams, respectively. Exposure 4 of assembly 8 resulted in the only net loss, 12.51 grams, that was above the acceptance criteria of 7.0 grams.

TABLE 5C

| | (Present Invention) | | | | |
|---|---|---|---|---|---|
| ASSEMBLY | 13 | 14 | 15 | 16 | 17 |
| Hose Type | GY4860 | GY4860 | GY4860 | GY4860 | GY4860 |
| Hose Size | 16 mm | 16 mm | 16 mm | 16 mm | 16 mm |
| Length of Test (Days) | 15 | 15 | 15 | 15 | 15 |
| Volume (cm3) | 15.3 | 15.3 1 | 15.3 | 15.3 | 15.3 |
| Initial Charge Amount (grams) | 91.49 | 91.19 | 90.44 | 84.87 | 94.31 |
| EXPOSURE 1 | | | | | |
| Initial Torque (in. lbs.) | 40 | 40 | 40 | 40 | 40 |
| Exposure Loss (grams) | 0.16 | 0.13 | 0.14 | 0.25 | 0.16 |
| Flex Loss (grams) | 0 | 0 | 0 | 0.01 | 0 |
| Net Loss (grams) | 0.16 | 0.13 | 0.14 | 0.26 | 0.16 |
| Avg Clamp Delta (in. lbs.) | 30 | 30 | 35 | 30 | 35 |
| Avg After Clamp Torque (in. lbs.) | 10 | 10 | 5 | 10 | 5 |
| EXPOSURE 2 | | | | | |
| Initial Torque (in. lbs.) | 10 | 10 | 5 | 10 | 5 |
| Exposure Loss (grams) | 0.52 | 0.26 | 0.44 | 0.43 | 0.06 |
| Flex Loss (grams) | 0 | 0 | 0.01 | 0 | 0.01 |
| Net Loss (grams) | 0.52 | 0.26 | 0.43 | 0.43 | 0.07 |
| Avg Clamp Delta (in. lbs.) | 0 | 0 | 0 | 0 | 0 |
| Avg After Clamp Torque (in. lbs.) | 10 | 10 | 5 | 10 | 5 |
| EXPOSURE 3 | | | | | |
| Initial Torque (in. lbs.) | 10 | 10 | 5 | 10 | 5 |
| Exposure Loss (grams) | 0.45 | 0.33 | 0.29 | 0.39 | 0.41 |
| Flex Loss (grams) | 0 | 0 | 0 | 0.05 | 0 |

TABLE 5C-continued

| | (Present Invention) | | | | |
|---|---|---|---|---|---|
| ASSEMBLY | 13 | 14 | 15 | 16 | 17 |
| Net Loss (grams) | 0.45 | 0.33 | 0.29 | 0.42 | 0.41 |
| Avg Clamp Delta (in. lbs.) | 0 | 5 | 0 | 0 | 0 |
| Avg After Clamp Torque (in. lbs.) | 10 | 5 | 5 | 10 | 5 |
| EXPOSURE 4 | | | | | |
| Initial Torque (in. lbs.) | 10 | 5 | 5 | 10 | 5 |
| Exposure Loss (grams) | 1.67 | 0.65 | 1.68 | 1.61 | 0.51 |
| Flex Loss (grams) | 0 | 0 | 0 | 0 | 0 |
| Net Loss (grams) | 1.67 | 0.65 | 1.68 | 1.61 | 0.51 |
| Avg Clamp Delta (in. lbs.) | 5 | 0 | 0 | 5 | 0 |
| Avg After Clamp Torque (in. lbs.) | 5 | 5 | 5 | 5 | 5 |
| SUMMARY DATA | | | | | |
| Total Loss (All Exp) | 2.8 | 1.37 | 2.54 | 2.72 | 1.15 |
| Avg Loss Rate (All Exp) | .23/day | .11/day | .21/day | .23/day | .10/day |
| Avg Delta (All Exp) | 8.75 | 8.75 | 8.75 | 8.75 | 8.75 |
| Avg After Clamp Torque (in. lbs.) | 8.75 | 7.5 | 5 | 8.75 | 5 |

Table 5C shows the results for assemblies 13–17 which utilize 16 mm diameter suction hoses. The net loss exhibited as a result of each exposure for every assembly was below the acceptance criteria of 7.0 grams. In fact, of the twenty (20) exposures shown in Table 5C, the net loss for seventeen (17) exposures was below 1.0 gram. The remaining three exposures, exposure 4 for assemblies 13, 15 and 16, resulted in net losses of 1.67 grams, 1.68 grams and 1.61 grams, respectively, still well below the acceptance criteria of 7.0 grams.

The total net loss for all assemblies (sum of total net losses of each assembly in Tables 5A–C) is 47.41 grams. This is a 79.68% improvement over the conventional R-12 clamping assembly. The average total loss for all assemblies using clamping system 10 of the present invention was 3.38 grams. This is an 91.3% improvement over the conventional R-12 clamping assembly. Thus, the average total loss for all assemblies using clamping system 10 was almost 1/10 that of the conventional R-12 clamping system.

Tables 6 and 7 show burst tests results for clamping system 10 of the present invention and the conventional R-12 clamping assembly, respectively. The media used during the burst tests was water. Referring to Table 6, clamping system 10 utilized barrier hoses constructed in accordance with barrier hose 16 and having diameters of 8 mm, 10 mm and 16 mm. The maximum amount of pressure applied was 2600 p.s.i. No bursts were exhibited.

TABLE 6

| | (Present Invention) | | | |
|---|---|---|---|---|
| | 8 mm | 10 mm | 10 mm | 16 mm |
| Burst Pressure (psi) | NA | NA | NA | NA |
| Max. Pressure (psi) | 2600 | 2600 | 2600 | 2600 |
| Burst Location | NONE | NONE | NONE | NONE |
| Remarks | NONE | NONE | NONE | NONE |

However, referring to Table 7, each rubber hose (8 mm, 10 mm and 16 mm diameters) of the conventional R-12 assembly did burst at pressures of 2400 p.s.i. and below. Table 7 also shows the burst location for each hose of the conventional assembly. The maximum limit of the testing apparatus was 2600 p.s.i.

TABLE 7

| | (Prior Art) | | | |
|---|---|---|---|---|
| | 8 mm | 10 mm | 10 mm | 16 mm |
| Burst Pressure (psi) | 2200 | 2200 | 2400 | 1500 |
| Max. Pressure (psi) | NA | NA | NA | NA |
| Burst Location | Hose at crimp | Hose at crimp | Hose | Fitting blew |
| Remarks | Crimp leaked at tube | Barb moved | Barb moved | |

The improvement in burst tests results, shown in Table 6, is the result of the increase in the area of surface contact between the hose and the fitting. The increase in surface contact area improves the frictional contact between the hose and the fitting thereby preventing slippage of the hose and creating a stronger hose-fitting joint.

Figure 9:
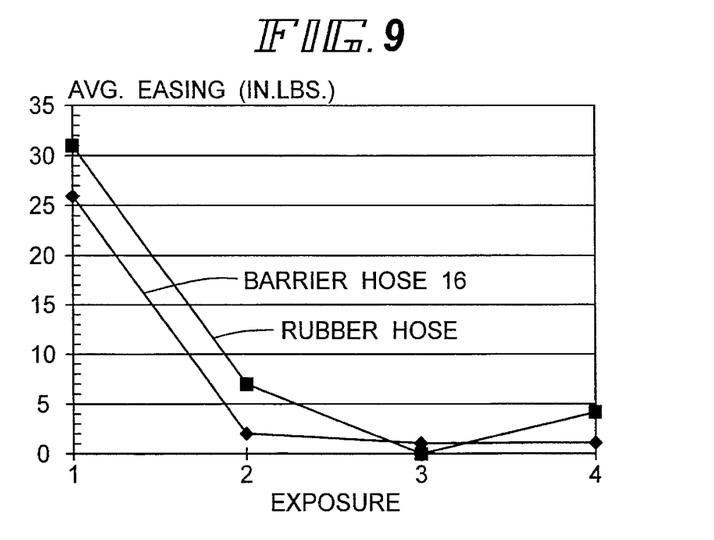
FIG. 9 graphically illustrates test results for determining average screw clamp easing for the clamping system of the present invention and the conventional clamping system.

FIG. 9 graphically shows test results for determining average screw clamp easing for the conventional R-12 clamping assembly and clamping system 10 of the present invention. Screw clamps typically deform the rubber material of rubber hoses during temperature cycling. The deformation results from the variations in the thermal expansion properties of the rubber due to the temperature cycling. Thus, the rubber will "plastically deform" under the screw clamp. When plastic deformation occurs, the rubber under the screw clamp has plastically deformed the surface of the hose which normally contacts the screw clamp. Thus, less rubber material is present to effect an adequate clamping force. The reduced clamping force reduces the hoop stress or clamp tension. This reduction in hoop stress or clamp tension (measured in inches-pounds (in. lbs.)) constitutes screw clamp easing. As described above, the conventional R-12 assembly consisted of a screw clamp and a rubber hose, and clamping system 10 utilized barrier hose 16. The screw clamp easing of clamping system 10 exhibited about a constant 3 lb. easing after the first exposure whereas the screw clamp easing of the conventional R-12 assembly begins to increase after the third exposure. Barrier hose 16, due to its structure, exhibits less deformation in comparison to the rubber hose of the conventional R-12 assembly thereby precluding a significant reduction in the clamping force, and reducing the degree of screw clamp easing.

It is preferred that clamping system 10 of the present invention be utilized with a medium having a molecular size similar to or larger than R-134a refrigerant. In particular, it is preferable that clamping system 10 be used for mediums having operating pressures between about 100 p.s.i.g. and 600 p.s.i.g.

Clamping system 10 of the present invention provides a cost effective approach to retrofitting or converting previously installed automotive air conditioning systems for use with R-134a refrigerant thereby eliminating the need to replace existing and functioning components, such as heat exchangers, and compressors due to barb fitting leakage problems resulting from the R-134a refrigerant.

While the present invention has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A hose to coupling joint comprising:

a tube-like fitting;

an elastomeric hose disposed on said fitting;

a constant tension, metallic clamp circumferentially disposed about the hose and clamping the hose on said fitting with substantially constant tension to maintain a clamping force on the hose and expand and contract as the hose expands and contracts to avoid permanent compression and deformation of the hose; and a constant displacement clamp circumferentially disposed about the hose and clamping the hose to said fitting, said constant displacement clamp being axially spaced along said hose from said constant tension clamp.

2. The joint of claim 1 wherein said fitting includes a barbed section and said constant displacement clamp clamps said hose about said barbed section.

3. The joint of claim 1 wherein said hose comprises a core tube having an opening receiving said fitting, an inner elastomer layer disposed on said core tube, a braided layer disposed over said inner elastomer layer, and an outer elastomer layer disposed over said braided layer.

4. The joint of claim 1 wherein said constant displacement clamp is a screw clamp and said constant tension clamp is a spring clamp.

5. The sealing system of claim 3 wherein said core is fabricated from neoprene rubber.

6. The sealing system of claim 3 wherein said inner elastomer layer is fabricated from nitrile butylene rubber.

7. The sealing system of claim 3 wherein said braid is fabricated from polyester.

8. The sealing system of claim 3 wherein said outer elastomer layer is fabricated from butyl.

9. The sealing system of claim 3 further including a barrier layer intermediate said core and said inner elastomer layer.

10. The sealing system of claim 9 wherein said barrier layer is fabricated from nylon.

11. A sealing system for use with a coupling, comprising:

a barrier hose including:

a core tube having an opening adapted for receiving the coupling so as to define a hose-coupling joint having a high pressure portion and a low pressure portion; an inner elastomer layer disposed over said core, a braided layer disposed over said inner elastomer layer, and an outer elastomer layer disposed over said braided layer; and a constant displacement clamp comprising a screw clamp for mounting on the high pressure portion of the joint, and a constant tension clamp comprising a spring clamp for mounting on the low pressure portion of the joint; said spring clamp and said screw clamp being spaced between about 0.087 inch and 0.107 inch, inclusive.

12. A method for sealing a hose to a coupling, comprising the steps of:

a) providing a sealing system comprising an annular constant displacement clamping portion and an annular metallic constant tension clamping portion;

b) placing said clamping system on the hose such that said constant tension clamping portion does not permanently compress or deform the hose;

c) placing the hose over the coupling to form a hose coupling joint having high pressure portion and a low pressure portion;

d) adjusting the sealing system such that the constant displacement clamping portion is positioned substantially on the high pressure portion of said joint, and the constant tension clamping portion is positioned substantially on the low pressure portion of the joint;

e) expanding and contracting the diameter of the constant tension clamping portion as the diameter of the joint expands and contracts, respectively; and f) maintaining the diameter of the constant displacement clamping portion as the diameter of the joint expands and contracts.

13. The method of claim 12 wherein said adjusting step includes setting the torque of the constant displacement clamping portion at about 40 in.-lbs.

14. The method of claim 12 wherein said adjusting step includes setting the distance between said constant displacement portion and said constant tension portion between about 0.087 inch and 0.107 inch, inclusive.

15. A kit for providing a seal for sealing a hose to a coupling wherein the hose and coupling define a joint having a high pressure portion and a low pressure portion, said kit comprising a plurality of annular sealing systems, each of which has a different diameter, each sealing system comprising:

a constant tension annular metallic clamp for mounting on the low pressure portion of the joint in circumferential sealing relation thereto; and a constant displacement annular metallic clamp for mounting on the high pressure portion of the joint.

16. The kit of claim 15 further including a hose having a predetermined amount of length.

17. The kit of claim 16 wherein said hose is a barrier hose.

18. A sealing system for use with an air conditioning system that uses R-134a refrigerant, said sealing system comprising:

a barrier hose having an opening for receiving a coupling associated with the air conditioning system so as to define a hose-coupling joint having a high pressure portion and a low pressure portion; and a clamping system including, means for providing a constant displacement clamp on said high pressure portion of said joint, and means for providing a constant tension clamp-circumferentially disposed on said low pressure portion of said joint.

* * * * *